United States Patent
Gu et al.

(10) Patent No.: US 9,396,280 B2
(45) Date of Patent: Jul. 19, 2016

(54) COMMAND DRIVEN WEB SITE BROWSING

(75) Inventors: Ye Gu, Seattle, WA (US); Brian Tunning, Shanghai (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 368 days.

(21) Appl. No.: 12/143,840

(22) Filed: Jun. 23, 2008

(65) Prior Publication Data

US 2009/0319954 A1    Dec. 24, 2009

(51) Int. Cl.
| | | |
|---|---|---|
| G06F 3/023 | (2006.01) | |
| G06F 17/30 | (2006.01) | |
| G06F 3/0481 | (2013.01) | |
| G06F 9/455 | (2006.01) | |

(52) U.S. Cl.
CPC .......... *G06F 17/30899* (2013.01); *G06F 3/023* (2013.01); *G06F 3/0481* (2013.01); *G06F 9/45512* (2013.01)

(58) Field of Classification Search
CPC ...... G06F 3/023; G06F 3/0481; G06F 3/0482
USPC ......... 715/864, 780, 748, 749, 760, 765, 802, 715/804, 805, 843, 845, 854, 968, 821–824, 715/810, 764; 707/10, 100; 455/418, 566
See application file for complete search history.

(56) References Cited

U.S. PATENT DOCUMENTS

| | | | |
|---|---|---|---|
| 6,049,796 A * | 4/2000 | Siitonen .............. | G06F 15/0283 707/711 |
| 6,262,735 B1 | 7/2001 | Etelapera | |
| 6,430,553 B1 * | 8/2002 | Ferret | |
| 6,691,111 B2 | 2/2004 | Lazaridis et al. | |
| 6,741,855 B1 | 5/2004 | Martin et al. | |
| 6,883,000 B1 * | 4/2005 | Gropper | |
| 7,054,487 B2 | 5/2006 | Ericson et al. | |
| 7,263,551 B2 | 8/2007 | Belfiore et al. | |
| 7,337,411 B1 * | 2/2008 | Racine ................. | G06F 3/0483 715/762 |
| 7,627,598 B1 * | 12/2009 | Burke | |
| 7,788,188 B2 * | 8/2010 | Kramer ................. | G06Q 30/02 705/14.58 |
| 8,484,564 B1 * | 7/2013 | Marti .................... | G06Q 50/01 463/42 |
| 8,666,929 B2 * | 3/2014 | Jaffer ........................... | 705/304 |

(Continued)

FOREIGN PATENT DOCUMENTS

| | | |
|---|---|---|
| CN | 1942856 A | 4/2007 |
| KR | 10-0836249 B1 | 6/2008 |
| WO | 2005/114439 A1 | 12/2005 |

OTHER PUBLICATIONS

International Search Report and Written Opinion Received for PCT Application No. PCT/US2009/044885, mailed on Dec. 30, 2009, 10 pages.
"Services/Drivers/Plugins Managers. .don't we Foget the most Important thing in all this" Date: Apr. 24, 2004, 11 Pages http://www.jnode.org/node/250.

(Continued)

*Primary Examiner* — Steven Sax
(74) *Attorney, Agent, or Firm* — Bryan Webster; Judy Yee; Micky Minhas

(57) ABSTRACT

Command driven web site browsing. As a part of command driven web site browsing a user supplied command is accessed that is submitted from a text input box in a web page of a browser and based on the user supplied command a web site is identified and accessed. The web site is automatically navigated to directly locate a predetermined place and/or perform a predetermined function therein which otherwise requires one or more user actions beyond the submission of a command to locate.

20 Claims, 9 Drawing Sheets

(56) References Cited

U.S. PATENT DOCUMENTS

| | | | |
|---|---|---|---|
| 2002/0038316 A1* | 3/2002 | Onyon et al. | 707/204 |
| 2002/0046209 A1* | 4/2002 | De Bellis | G06F 17/30392 |
| 2003/0035519 A1* | 2/2003 | Warmus | 379/88.17 |
| 2004/0119761 A1* | 6/2004 | Grossman | G06Q 10/10 715/854 |
| 2004/0135819 A1* | 7/2004 | Maa | 345/840 |
| 2004/0139107 A1* | 7/2004 | Bachman | G06F 17/30864 |
| 2004/0243939 A1* | 12/2004 | Perepa et al. | 715/739 |
| 2004/0249801 A1* | 12/2004 | Kapur | G06F 17/30864 |
| 2005/0076017 A1* | 4/2005 | Rein | G06Q 30/02 |
| 2005/0097089 A1 | 5/2005 | Nielsen et al. | |
| 2005/0125570 A1* | 6/2005 | Olodort et al. | 710/15 |
| 2005/0172229 A1 | 8/2005 | Reno et al. | |
| 2006/0099931 A1* | 5/2006 | Trujillo | 455/412.1 |
| 2006/0116900 A1* | 6/2006 | Jensen | 705/1 |
| 2006/0117388 A1* | 6/2006 | Nelson et al. | 726/25 |
| 2006/0168335 A1 | 7/2006 | Hodjat et al. | |
| 2006/0168541 A1* | 7/2006 | Hill et al. | 715/810 |
| 2006/0271520 A1* | 11/2006 | Ragan | G06F 17/30663 |
| 2006/0294063 A1* | 12/2006 | Ali et al. | 707/3 |
| 2007/0067275 A1* | 3/2007 | Shekel | G06F 17/30867 |
| 2007/0074100 A1* | 3/2007 | Yan | 715/505 |
| 2007/0130151 A1* | 6/2007 | Wiles | G06F 17/30887 |
| 2007/0142364 A1* | 6/2007 | Legarda Ibanez | A61K 31/55 514/220 |
| 2007/0157118 A1* | 7/2007 | Wuttke | G06Q 10/10 715/810 |
| 2007/0226369 A1 | 9/2007 | Laing et al. | |
| 2007/0244856 A1* | 10/2007 | Plastina et al. | 707/3 |
| 2007/0250468 A1* | 10/2007 | Pieper | G06F 17/3089 |
| 2008/0065974 A1 | 3/2008 | Campbell | |
| 2008/0133677 A1* | 6/2008 | Pattabhiraman | G06Q 10/00 709/206 |
| 2008/0313210 A1* | 12/2008 | Cooperstein et al. | 707/102 |
| 2009/0003704 A1* | 1/2009 | Hwang et al. | 382/181 |
| 2009/0024587 A1* | 1/2009 | Kamani et al. | 707/3 |
| 2009/0024650 A1* | 1/2009 | Kamani et al. | 707/102 |
| 2009/0227289 A1* | 9/2009 | Celik | 455/558 |
| 2009/0240658 A1* | 9/2009 | Chang | 707/3 |
| 2009/0280843 A1* | 11/2009 | Wisebourt | H04L 12/5815 455/466 |
| 2009/0303187 A1* | 12/2009 | Pallakoff | G06F 3/0488 345/169 |
| 2010/0035596 A1* | 2/2010 | Nachman et al. | 455/418 |
| 2010/0211557 A1* | 8/2010 | Gupta | 707/706 |

OTHER PUBLICATIONS

"Humanizing the User Interface—The Power of the Command Line, Natural Language and ZUIs", Date: Jul. 26, 2007, 5 Pages http://weblog.cenriqueortiz.com/hci/2007/07/26/humanizing-the-user-interface-the-power-of-the-command-line-natural-language-and-zuis/.

"The Decline of the Graphical User Interface (2): Rise of the Command Line". 2007. http://www.endofcyberspace.com/2007/12/the-decline-of.html.

Int. Preliminary Report cited in PCT Application No. PCT/US2009/044885 dated Jan. 5, 2011, 4 pgs.

Reply to second Chinese Office Action cited in Chinese Application No. 200980124673.5 dated Jan. 21, 2013, 1 pg.

Third Chinese Office Action cited in Chinese Application No. 200980124673.5 dated May 2, 2013, 8 pgs.

Reply third Chinese Office Action cited in Chinese Application No. 200980124673.5 dated Jun. 28, 2013, 1 pg.

First Chinese Office Action cited in Chinese Application No. 200980124673.5 dated Feb. 15, 2012, 7 pgs.

Reply First Chinese Office Action cited in Chinese Application No. 200980124673.5 dated Jun. 28, 2012, 11 pgs.

Second Chinese Office Action cited in Chinese Application No. 200980124673.5 dated Dec. 17, 2012, 7 pgs.

Fourth Chinese Office Action cited in Chinese Application No. 200980124673.5 dated Jan. 3, 2014, 6 pgs.

Reply fourth Chinese Office Action cited in Chinese Application No. 200980124673.5 dated Apr. 20, 2014, 1 pg.

Reply fourth Chinese Office Action cited in Chinese Application No. 200980124673.5 dated Apr. 30, 2014, 1 pg.

Fifth Chinese Office Action cited in Chinese Application No. 200980124673.5 dated Sep. 2, 2014, 7 pgs.

Reply fifth Chinese Office Action cited in Chinese Application No. 200980124673.5 dated Sep. 16, 2014, 4 pgs.

Final Chinese Office Action cited in Chinese Application No. 200980124673.5 dated Jan. 2, 2015, 6 pgs.

Reply/Claims final Chinese Office Action cited in Chinese Application No. 200980124673.5 dated Apr. 24, 2015, 2 pgs.

Korean Office Action cited in Korean Application No. 10-2010-7028705 dated Aug. 21, 2015, 5 pgs.

Notice on Reexamination with English Translation, issued in Chinese Application No. 200980124673.5, dated Dec. 4, 2015, 8 pages.

Decision on Reexamination (with English Translation), received in counterpart Chinese Application No. 200980124673.5, dated Apr. 29, 2016, 10 pages.

* cited by examiner

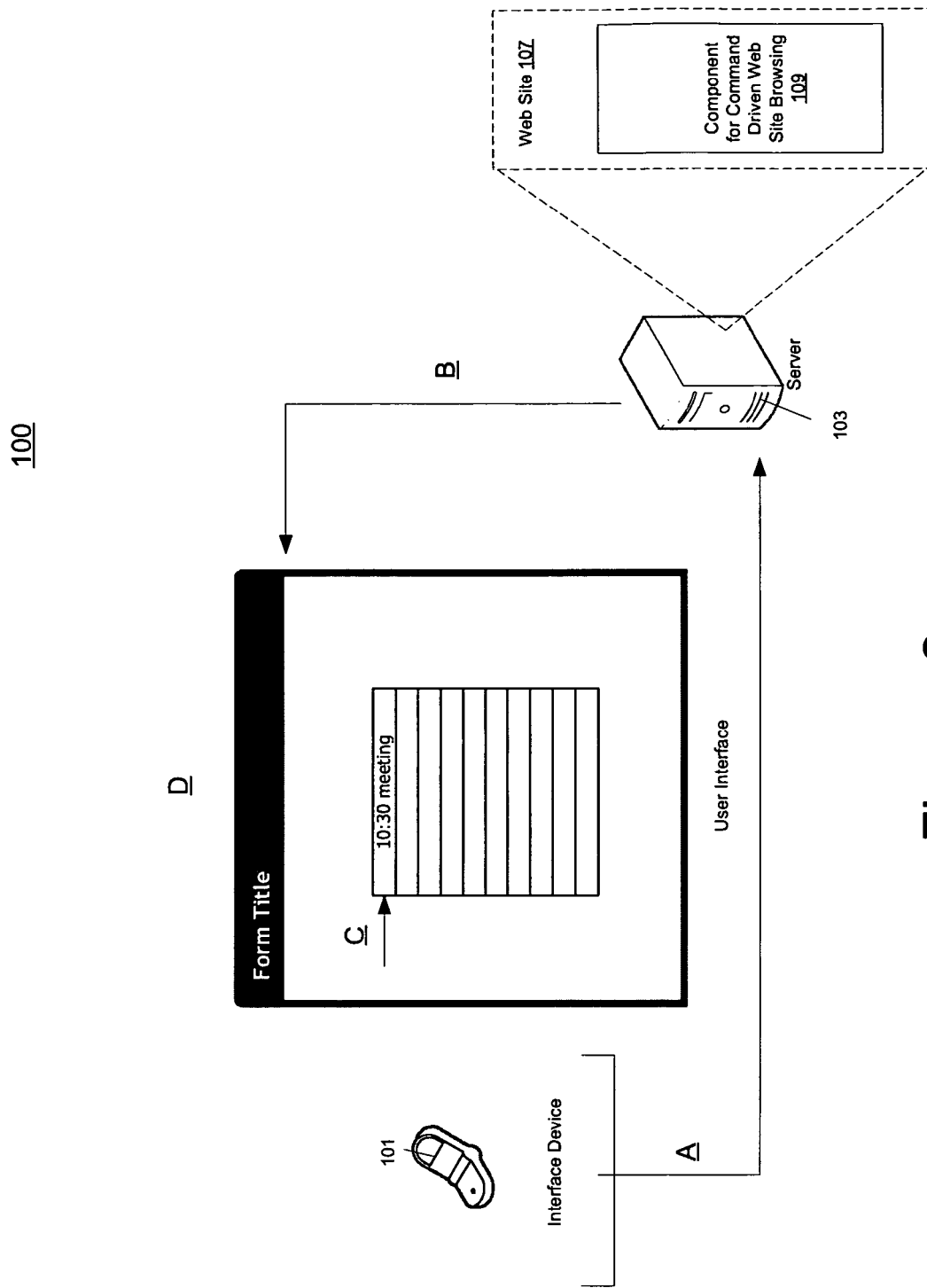

COMMAND DRIVEN WEB SITE BROWSING

BACKGROUND

A web browser is a software application that enables a user to display and interact with text, images, videos, music and other information that may be located on a Web page at a website that is accessible via the Internet or local area network. A web page can contain hyperlinks to other web pages that may be located at the same or different website. Web browsers allow a user to move easily between web pages by utilizing these links.

Conventional Web browsers that are currently available for personal computers include Internet Explorer™, Mozilla Firefox™, Safari™, Opera™, Flock™ and AOL Explorer™. Web browsers are the most commonly used type of HTTP user agent. Although browsers are typically used to access the Internet, they can also be used to access information provided by servers that support private networks or content in file systems.

Mobile devices that have the capacity to access the Internet employ the use of browsers. Mobile web browsers are designed to operate with mobile devices and are intended to provide users of mobile device with much of the functionality that is provided by ordinary browsers.

However, in many cases, browsing a web page using a mobile web browser on a mobile phone results in a very poor user experience. There are numerous challenges that contribute to poor user experience. In particular, mobile web sites typically are designed such that users have to click through many pages to get to the information they're looking for. Moreover, in many countries cellular networks are characterized by slow speeds, and consequently users end up spending excessive amounts of time navigating around a site. The aforementioned shortcomings of current mobile web browsing systems result in user dissatisfaction, especially for more advanced users, and an overall low adoption rate of mobile browsing usage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Web browsers enable a user to display and interact with text, images, videos, music and other information that may be located on a web page at a website. Web sites are designed such that users may have to click through many pages to get to the information for which they're looking. This combined with the slow speeds that characterize cellular networks can contribute to a poor user experience. Command driven web site browsing that enables the direct retrieval of desired web page content is disclosed. As a part of the disclosed command driven web site browsing methodology, a user supplied command is received that is submitted from a text input box in a web page of a browser and based on the submitted command a web site is identified and rendered on a display. The web site is automatically navigated to directly locate a predetermined place and/or perform a predetermined function in the web site. The predetermined place which is directly located and/or the predetermined function which is directly performed, otherwise require one or more user actions beyond the submission of a command, or the selection of a link to locate.

BRIEF DESCRIPTION OF THE DRAWINGS

The accompanying drawings, which are incorporated in and form a part of this specification, illustrate embodiments and, together with the description, serve to explain the principles of the embodiments:

FIG. 2 illustrates operations performed in a command driven web site navigation process according to one embodiment.

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1A:
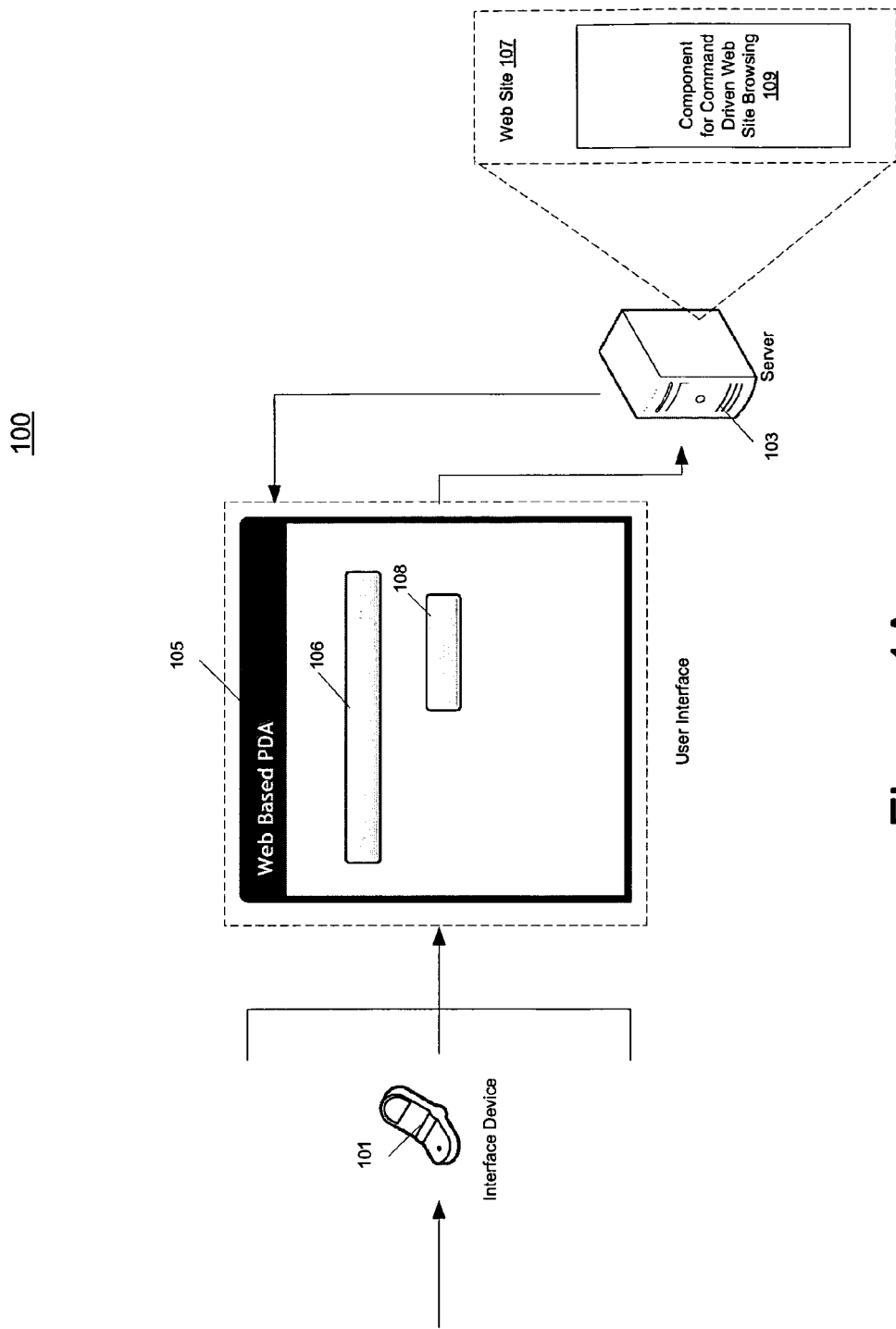
FIG. 1A shows an exemplary setting of a component for command driven web site browsing according to one embodiment.

Exemplary Network Setting of Component for Command Driven Web Site Browsing According to Embodiments FIG. 1A shows an exemplary operational setting 100 of a component 109 for command driven web site browsing according to one embodiment. Web sites are designed such that users may have to click through many pages to get to the information for which they're looking. This combined with the slow speeds that characterize cellular networks can contribute to a poor user experience. Component 109 for command driven web site browsing enables the direct accessing of desired web page content that eliminates the necessity of clicking through several links in order to access desired content. FIG. 1A shows interface device 101, server 103, user interface 105, text input box 106, web site 107 and component 109.

Referring to FIG. 1A, interface device 101 is a computer system that enables a user to access web site 107 (e.g., web based service etc.) via a user interface 105. In one embodiment, interface device 101 is a mobile device (e.g., cell phone, PDA etc.). In other embodiments, interface device 101 can include but is not limited to laptop and desktop computer systems, User interface 105 is a graphically constituted web page that is presented to a user of interface device 101 and accommodates the input of information or the selection of links that control web site navigation. In one embodiment, user interface 105 accommodates the input of commands via text input box 106 and provides graphical button 108 for submitting the commands to a web site.

Server 103 is a computer system that hosts a web site 107. In one embodiment, web site 107 can include but is not limited to services such as a web based email service, a web based address book, a web based calendaring service etc. More specifically, web site 107 can include any web based service that can operate in conjunction with embodiments of the command driven browsing component 109 (shown in FIG. 3 below) that are described herein. In one embodiment, web site 107 can encompass component 109 for command driven web site browsing. In other embodiments, web site 107 can be separate from component 109 for command driven web site browsing but can operate cooperatively therewith. In one embodiment, web site 107 is a mobile web site.

Component 109 for command driven web site browsing is an executable program that automatically navigates a web site to arrive at a predetermined point of navigation in response to a command submitted by a visitor to web site 107 via text input box 106. In one embodiment, as a part of component 109 operation a user supplied command can be placed into text input box 106 of user interface 105 and submitted by selecting graphical button 108. In one embodiment, based on the user supplied command a web page associated with a particular web site is identified and accessed. Moreover, based on the user supplied command the web site is automatically navigated without additional input from the user to arrive at a predetermined point of navigation. In one embodiment, the predetermined point of navigation is a point of navigation that would otherwise require user action such as selecting links and/or entering information into a text input box. Component 109 can be provided in hardware, software or a combination of both.

Figure 1B:
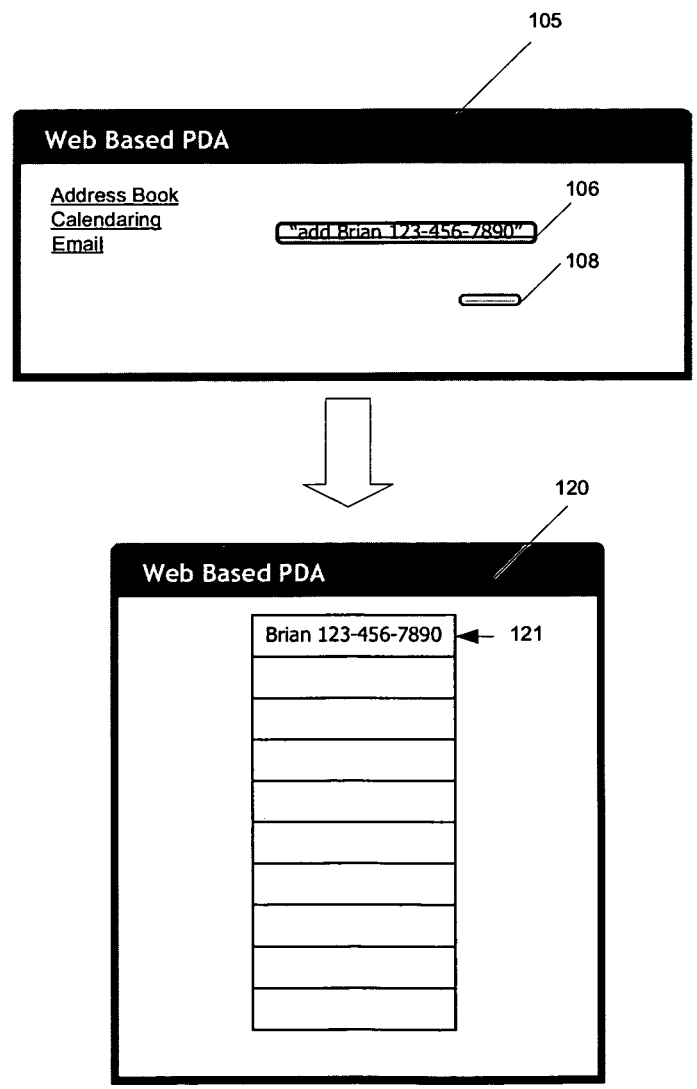
FIG. 1B illustrates the efficiency of command driven web site browsing according to one embodiment.
Figure 1C:
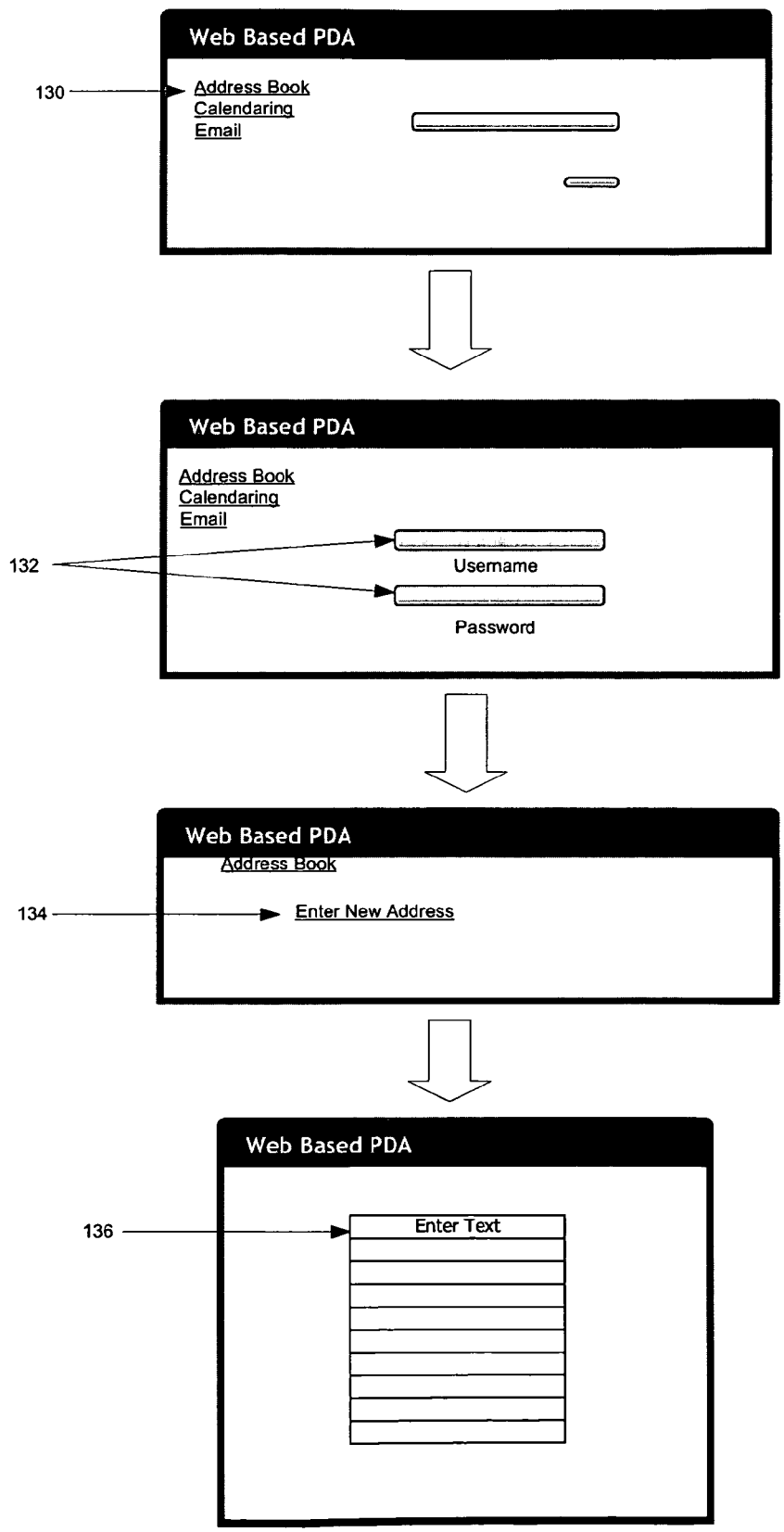
FIG. 1C illustrates the inefficiency of link driven web site browsing as contrasted with the methodology illustrated in FIG. 1B according to one embodiment.
Figure 1D:
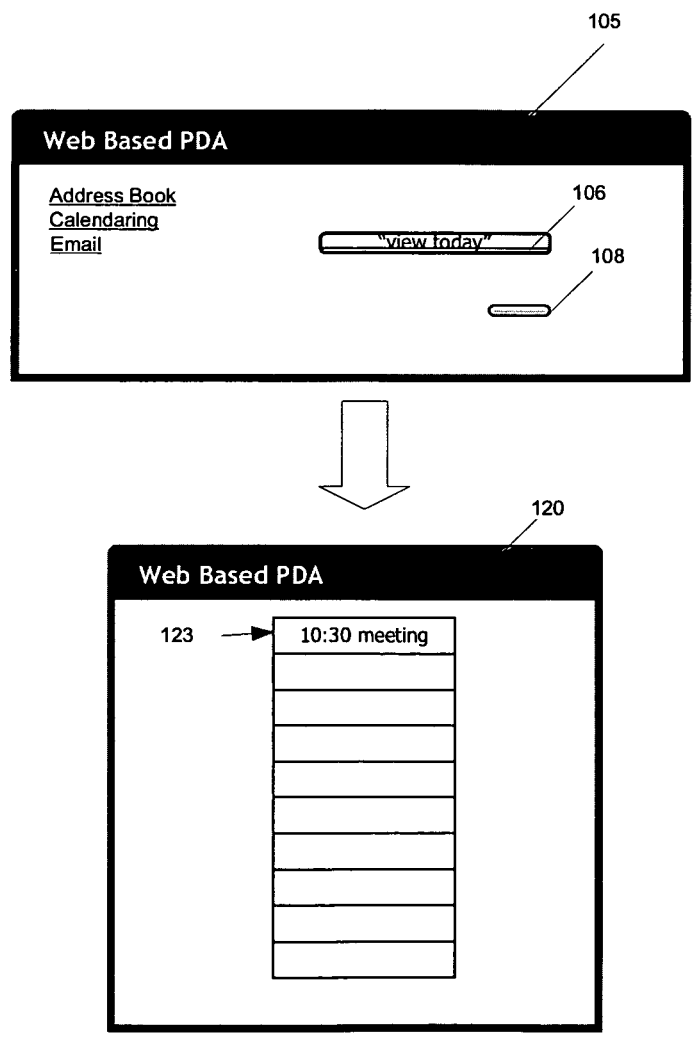
FIG. 1D illustrates the efficiency of command driven web site browsing according to one embodiment.
Figure 1E:
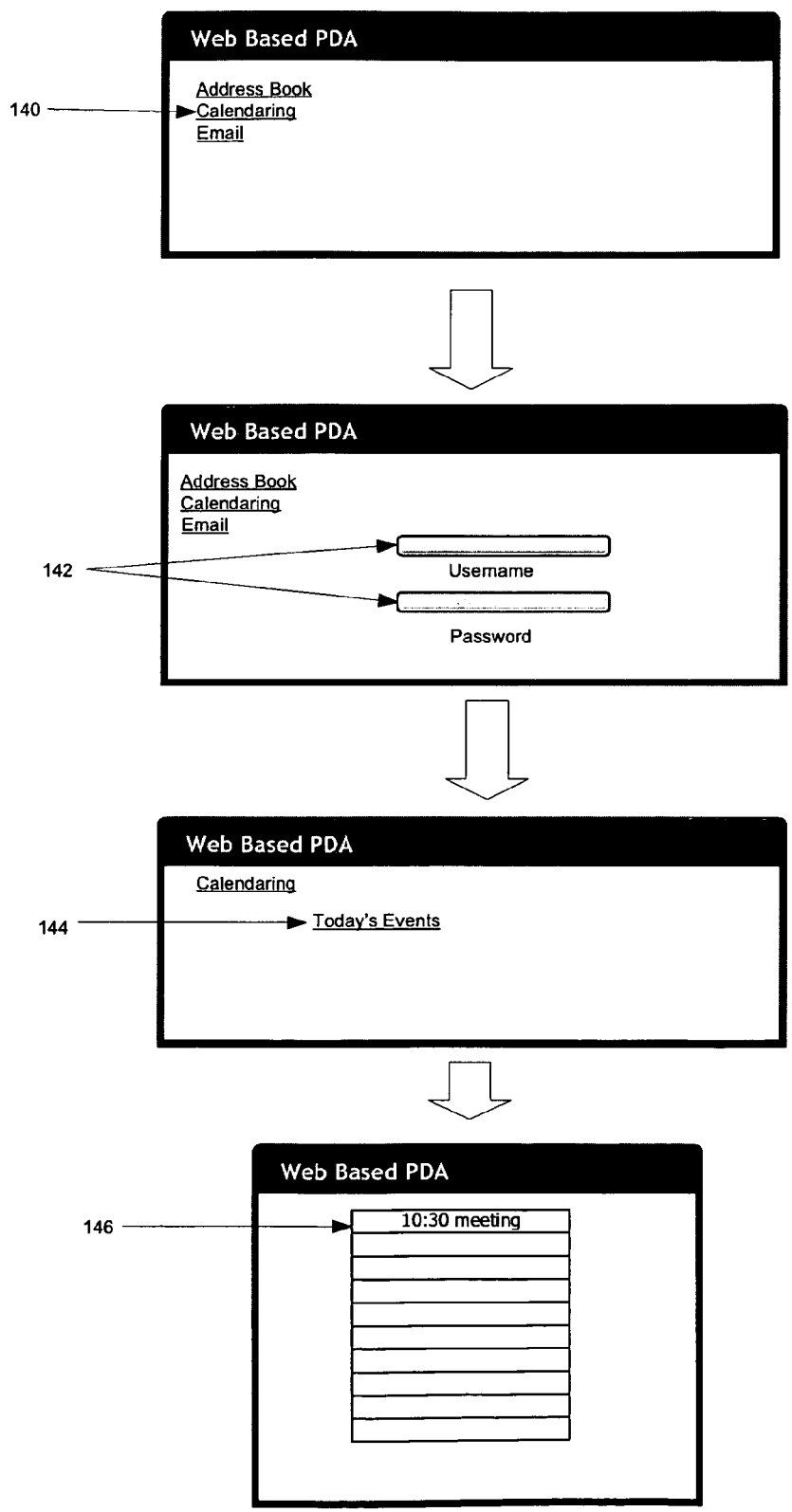
FIG. 1E illustrates the inefficiency of link driven web site browsing as contrasted with the methodology illustrated in FIG. 1D according to one embodiment.

FIGS. 1B-1E illustrate the efficiency of command driven web site browsing. Referring to FIG. 1B and FIG. 1E, consider cases where a mobile phone user types "add Brian 123-456-7890" (FIG. 1B) or "view today" (FIG. 1D) into text input box 106 of user interface 105, where the former is a command associated with a web based address book service and the latter is a command associated with a web based calendaring service. As it regards the submission of the former command, in one embodiment, a browse page can be automatically returned showing the information "Brian 123-456-7890" already entered in the user's address records 121. As it regards the submission of the latter command, in one embodiment, a browse page can be automatically returned where the user's calendar of events for the day are displayed for the user to review 123 (e.g., 10:30 meeting). It should be appreciated that in this example, other points on the navigational path to the user's address records and calendar of events respectively using conventional web site navigational methodologies are skipped as shown in FIGS. 1C and 1E.

Referring to FIG. 1C user actions required to make a new entry into the address book such as illustrated in FIG. 1B using conventional methodologies include but are not limited to: the selection of a link 130, the entry of a user name and password 132, the selection of a link that opens a place for a new entry to be made 134 and the manual entry of the new address into address book records 136. Referring to FIG. 1E user actions required to cause the display of the day's calendar events such as illustrated in FIG. 1C using conventional methodologies include but are not limited to: the selection of a link 140 (e.g., calendaring), the entry of a user name and password 142 and the selection of a link that opens a place for a new entry to be made 144 (today's events) which may then be reviewed 146. Contrasting the user actions required by the command driven browsing of exemplary embodiments illustrated in FIGS. 1B and 1D and the conventional link driven browsing of FIGS. 1C and 1E underscores the efficiency of command driven browsing that relieves a user from the necessity of performing many user actions. Consequently, the user's browsing experience is improved as a user can access a desired place in a service directly by typing a single command.

Operation

FIG. 2 illustrates operations A-D performed in a command driven web site navigation process according to one embodiment. These operations including the order in which they are presented are only exemplary. In other embodiments, other operations in other orders can be included.

At A, a web site (e.g., mobile web site) visitor enters a command into the text input box of a user interface (see FIG. 1A) and submits the command. In one embodiment, the command that is entered into the text input box of the user interface is a command that is recognized by component 109.

At B, a browse page under a particular web site (e.g., mobile web site etc.) is accessed (e.g., 120 in FIGS. 1B and 1D).

At C, the browse page is automatically navigated to directly reach a predetermined point of navigation. This is illustrated in FIG. 2 where the presentation of the day's calendar events is reached. In this manner, the necessity to perform several actions for the purpose of reaching the predetermined navigational point is eliminated.

At D, the desired web based service destination is presented to the web site visitor.

Exemplary Implementation Details

Search user interfaces are a common feature of many mobile web sites. In one embodiment, search boxes (e.g., 106 in FIG. 1A) of such web sites are leveraged to allow users to enter text commands into the search boxes and, instead of returning search results, take them to a page or form under a particular web site based on the entered command (e.g., 105 in FIG. 1A). In one embodiment, this command-driven browse UI, allows users to quickly access services or perform tasks (such as in a mobile browser environment as shown in FIGS. 1A-1E and 2).

Most conventional browse-based web user interfaces (UIs) rely on hyperlinks for navigation. A user typically starts from a well-known web site, such as a portal, and traverses web pages or forms by following links within each page. Exemplary embodiments depart from this sequential pattern by allowing the user to directly locate the content he/she is looking for using commands (see FIGS. 1B and 1D). In this manner the user can access desired content without having to click through many pages. Accordingly, exemplary embodiments offer an alternative navigation model to the conventional browse paradigm.

Embodiments have utility because they provide users the ability to find relevant information in a single step (see FIG. 2). This is particularly important in the wireless environment since mobile users generally find it difficult to browse through many pages in order to get to the data they're interested in. It should be appreciated that increasing numbers of mobile web sites now feature a search UI (e.g., 105 in FIG. 1A), which consists of a text input box for inputting keywords and a search button for submitting them to a web site. The conventional systems allow users to type in keywords and then click on the search button and see one or more web pages containing the results that the site has found. The focus of such searches is on data, whether it's personal to a user or public on the internet.

In exemplary embodiments the UIs that are provided (e.g., 105 in FIG. 1A) are leveraged explicitly for navigation and tasks. It should be appreciated that the prevalence of search UIs and their inclusion on many web pages provides support for exemplary embodiments.

In one embodiment, text input boxes of such search UIs (e.g., 105 in FIG. 1A) can be overloaded for commands instead of keywords. Based on these commands a user can enter a command rather than a set of keywords and a web site can execute the command and provide the appropriate response. A user can invoke the commands from anywhere there is a search UI (e.g., 105 in FIG. 1A) that supports this command function. In addition, if the search UI (e.g., 105 in FIG. 1A) implements word-wheeling, the site can embed all the available commands into a candidate list. As the user enters letters, a dropdown list can be directed to appear to show all possible commands that match what has been typed in. In one embodiment, word-wheeling can be more accurate and useful since a site may have a finite number of commands that it can support. In fact, word-wheeling can help minimize any learning curve associated with new users trying to figure out and remember what commands are available from a mobile site.

In one embodiment, the command driven search methodology described herein can function in tandem with traditional point and click UIs to complement their navigational models. For example, in one embodiment, if users enter an incomplete command into the text box (e.g., 106 in FIG. 1A), for instance "email Joe@joe.com" where an email body and subject are normally required to send an email message, no error will be produced as component 109 will recognize what is intended, and can respond by for example, providing the email compose form with the "sender" already filled out. In one embodiment, a user can freely mix using the command box as well as the traditional uses of the UI as they see fit.

Figure 3:
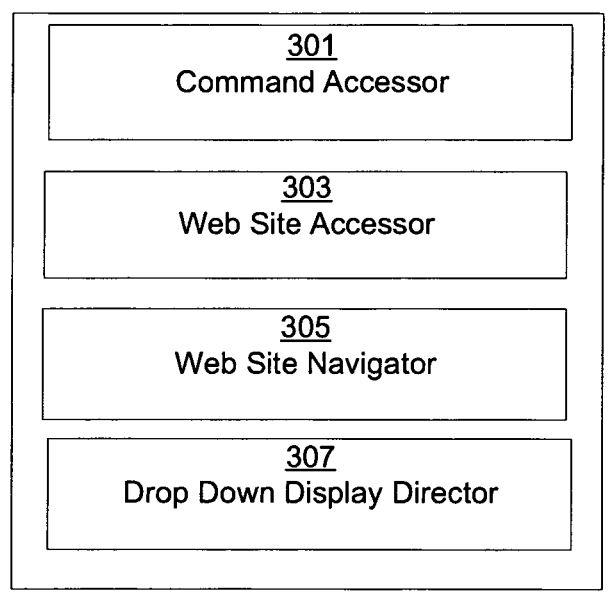
FIG. 3 shows subcomponents of a component for command driven web site browsing according to one embodiment.

Subcomponents of Component for Command Driven Web Site Browsing According to Embodiments FIG. 3 shows subcomponents of a component 109 for command driven web site browsing according to one embodiment. In one embodiment, component 109 implements an algorithm for command driven web site browsing. In the FIG. 3 embodiment, component 109 subcomponents include command accessor 301, web site accessor 303, web site navigator 305 and drop down display director 307.

It should be appreciated that the aforementioned subcomponents of component 109 can be implemented in hardware or software or in a combination of both. In one embodiment, components and operations of component 109 can be encompassed by components and operations of one or more computer programs (e.g. computer programs associated with a web site). In another embodiment, components and operations of component 109 can be separate from the aforementioned one or more computer programs but can operate cooperatively with components and operations thereof.

Referring to FIG. 3, command accessor 301 accesses a user supplied command that is submitted from a text box of a user interface. In one embodiment, the user supplied command identifies a specific place or task that is to be respectively navigated to or performed.

Web site accessor 303 identifies and accesses a web site based on the user supplied command. In one embodiment, the accessed web site supports command driven web site browsing. In one embodiment, the web site can include but is not limited to email web site, address book web site and calendaring web site.

Web site navigator 305 automatically navigates a web site to directly locate a predetermined place, or to automatically perform a predetermined task therein which otherwise requires one or more user actions beyond the submission of a keyword or the selection of a link to locate. In one embodiment, based on the user supplied command the web site is automatically navigated without additional input from the user to arrive at a predetermined point of navigation or to perform a predetermined task.

Drop down display director 307 directs the dropping down of a display that shows possible text box entries. For example, in one embodiment, in response to an incomplete command placed in the text box, drop down display director can direct the display of all possible entries known to the component 109 in a drop down display.

Figure 4:
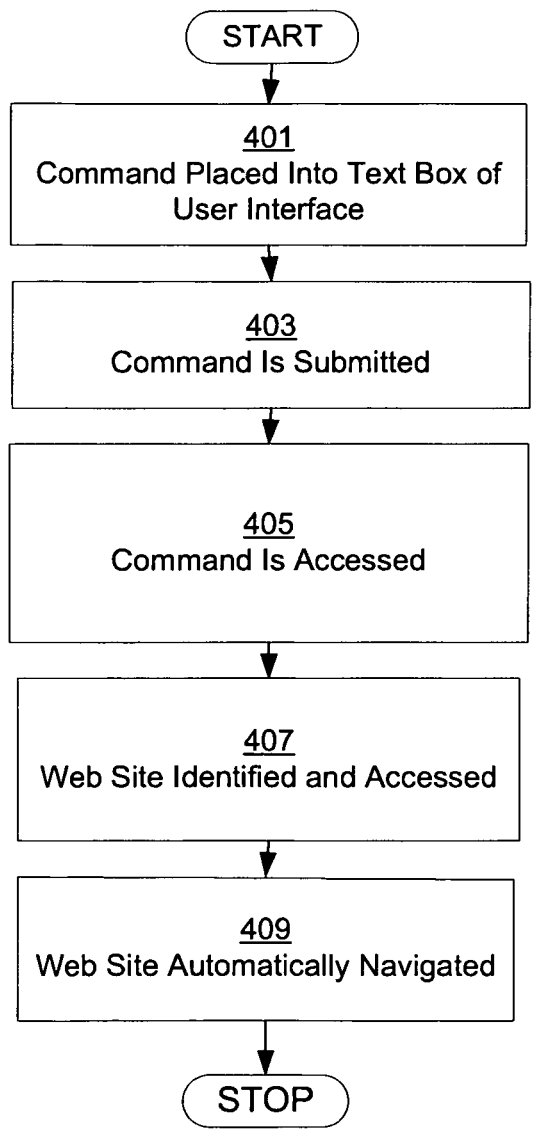
FIG. 4 shows a flowchart of the steps performed in a method for command driven web site browsing according to one embodiment.

Exemplary Operations of Method for Command Driven Web Site Browsing According to Embodiments FIG. 4 shows a flowchart 400 of the steps performed in a method for command driven web site browsing according to one embodiment. The flowchart includes processes that, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 4, at step 401 a command is placed into a text box of a user interface.

At step 403, the command placed into the text box of the user interface is submitted.

At step 405, the user supplied command that is submitted from a text box of a user interface is accessed. In one embodiment, the user supplied command identifies a specific place or task that is to be respectively navigated to or performed.

At step 407, a web site is identified and accessed based on the user supplied command. In one embodiment, the accessed web site supports command driven web site browsing. In one embodiment, the web site can include but is not limited to an email web site, address book web site and calendaring web site.

At step 409, the web site is automatically navigated to directly locate a predetermined place within the web site. In one embodiment, in addition to locating the predetermined place, a predetermined task is automatically performed therein (e.g., making an address entry, filling in sender for email message). In one embodiment locating the predetermined place otherwise requires one or more user actions beyond the submission of a command to locate. In one embodiment, based on the user supplied command the web site is automatically navigated without additional input from the user to arrive at a predetermined point of navigation.

Figure 5:
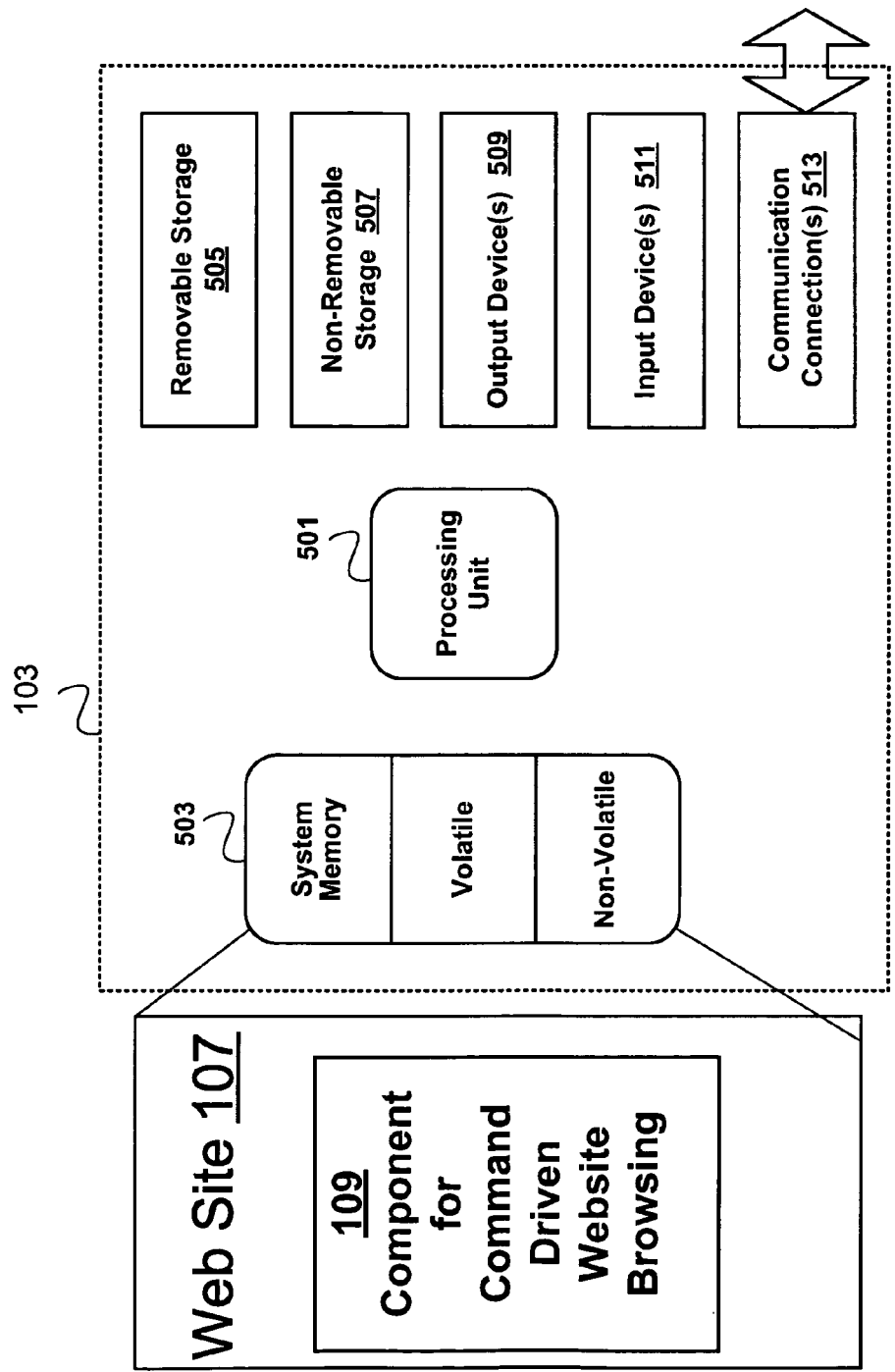
FIG. 5 shows an exemplary computing device according to one embodiment.

Exemplary Hardware Operating Environment of Component for Command Driven Web Site Browsing According to One Embodiment FIG. 5 shows computing device 103 and components thereof according to one embodiment. Referring to FIG. 5, computing device 103 can be included as a part of a server as shown in FIG. 1A in accordance with one embodiment. Computing device 103 typically includes at least some form of computer readable media. Computer readable media can be any available media that can be accessed by computing device 103 and can include but is not limited to computer storage media.

In its most basic configuration, computing device 500 typically includes processing unit 501 and system memory 503. Depending on the exact configuration and type of computing device 500 that is used, system memory 503 can include volatile (such as RAM) and non-volatile (such as ROM, flash memory, etc.) elements or some combination of the two. In one embodiment, as shown in FIG. 5, component 109 for command driven navigation of a web site (see description of component 109 made with reference to FIG. 1A) can reside in system memory 503. In one embodiment, component 109 can be encompassed by web site 107. In another embodiment, component 109 can be separate from web site 107 but can operate cooperatively therewith. In one embodiment, component 109 can be implemented in software, in hardware or in a combination of both.

Additionally, computing device 500, especially the version that can be a part of server 103 in FIG. 1A, can include mass storage systems (removable 505 and/or non-removable 507) such as magnetic or optical disks or tape. Similarly, computing device 500 can include input devices 511 and/or output devices 509 (e.g., such as a display). Additionally, computing device 500 can include network connections 513 to other devices, computers, networks, servers, etc. using either wired or wireless media. As all of these devices are well known in the art, they need not be discussed in detail.

With reference to exemplary embodiments thereof command driven web site browsing (mobile, wired etc.) is disclosed. As a part of command driven web site browsing a user supplied command is accessed that is submitted from a text input box of a browser and based on the user supplied command a web site is identified and accessed. The web site is automatically navigated to directly locate a predetermined place therein which otherwise requires one or more user actions beyond the submission of a keyword or selection of a link to locate.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for web command interpretation comprising:
    accepting an input from a user through a search box of a web site in a browser;
    determining whether the input comprises a command that does not correspond to a search;
    responsive to determining that the input does not comprise a command that does not correspond to a search, performing a search for one or more keywords comprised in the input; and
    responsive to determining that the input comprises a command that does not correspond to a search:
        determining that the command is directed to a personal record of the user and comprises an action item and content for updating the personal record, wherein the action item is semantically analyzed to determine how, from a plurality of update operations, the personal record is to be updated with the content; and
        executing the input when the command is directed to the personal record, the executing comprising:
            displaying the personal record associated with the command; and
            updating the personal record based on the command by modifying existing content in an entry in the personal record with the content from the command based on the semantic analysis of the action item in the command,
    at least some of the method implemented at least in part via a processing unit.

2. The method of claim 1, the browser executing on a portable device.

3. The method of claim 1, the personal record associated with an application other than the browser and the executing comprising launching the application.

4. The method of claim 1, the personal record associated with at least one of an email service, an address book, or a calendar service.

5. The method of claim 1, the command comprising a single line of text.

6. The method of claim 1, the input comprising at least one of an add contacts command, a remove contacts command, or an edit calendar command.

7. The method of claim 1, comprising providing a result of the executing in a single action.

8. The method of claim 1, the determining that the command is directed to a personal record comprising comparing one or more words of the command to one or more words listed in a word wheel.

9. The method of claim 1, comprising suggesting at least a portion of the input based at least in part on a drop down suggestion list.

10. The method of claim 1, comprising suggesting at least a portion of the input based at least in part on a learning curve associated with one or more users.

11. A system for web command interpretation comprising:
    a command component configured to receive an input from a user through a search box of a portable device; and
    a navigation component configured to:
        determine whether the input comprises a command not corresponding to a search;
        responsive to determining that the input does not comprise a command not corresponding to a search, initiate a search using one or more keywords of the input; and responsive to determining that the input comprises a command not corresponding to a search:
   determine that the command is directed to a personal record of the user and comprises an action item and content for updating the personal record wherein the action item is semantically analyzed to determine how, from a plurality of update operations, the personal record is to be updated with the content; and
   execute the input when the command is directed to the personal record, the executing comprising:
      updating the personal record based on the command by modifying existing content in an entry in the personal record with the content from the command based on the semantic analysis of the action item in the command; and
      returning a web page comprising the personal record associated with the command for display at the portable device.

12. The system of claim 11, the personal record associated with an application and the executing comprising launching the application.

13. The system of claim 11, the executing comprising launching an application comprising at least one of an email service, an address book, or a calendar service.

14. The system of claim 11, the command comprising a single line of text.

15. The system of claim 11, the determining that the command is directed to a personal record comprising comparing one or more words of the command to one or more words listed in a word wheel.

16. The system of claim 11, the search box presented through a browser.

17. A non-volatile computer-readable storage device storing instructions, which when executed perform acts, comprising:
   receiving an input submitted from a user through a search box of a portable device;
   determining whether the input comprises a command that does not correspond to a search;
   responsive to determining that the input does not comprise a command that does not correspond to a search, performing a search for one or more keywords of the input; and
   responsive to determining that the input comprises a command that does not correspond to a search:
      determining that the command is a command to add contact information to a contact list, the contact information included in the input submitted from the user through the search box, wherein the determination is based on analyzing a part of the input that is not the contact information;
      executing the command to add the contact information to the contact list; and
         returning a web page comprising the added contact information based on the command for display at the portable device.

18. The computer-readable storage device of claim 17, comprising suggesting at least a portion of the input based at least in part on word wheeling.

19. The computer-readable storage device of claim 17, comprising suggesting at least a portion of the input based at least in part on a drop down suggestion list.

20. The computer-readable storage device of claim 17, the executing comprising launching an address book service.

* * * * *